United States Patent [19]
Boy

[11] Patent Number: 6,144,346
[45] Date of Patent: Nov. 7, 2000

[54] ANTENNA ARRANGEMENT

[75] Inventor: Dierk Boy, Hannover, Germany

[73] Assignee: Robert Bosch GmbH, Stuttgart, Germany

[21] Appl. No.: 09/269,054

[22] PCT Filed: Aug. 16, 1997

[86] PCT No.: PCT/DE97/01763

§ 371 Date: Mar. 18, 1999

§ 102(e) Date: Mar. 18, 1999

[87] PCT Pub. No.: WO98/12773

PCT Pub. Date: Mar. 26, 1998

[30] Foreign Application Priority Data

Sep. 20, 1996 [DE] Germany ............................ 196 38 597

[51] Int. Cl.[7] ...................................................... H01Q 1/36
[52] U.S. Cl. ........................................... 343/866; 343/841
[58] Field of Search .................................... 343/741, 742, 343/743, 744, 745, 866, 895

[56] References Cited

U.S. PATENT DOCUMENTS

| | | | |
|---|---|---|---|
| 3,588,905 | 6/1971 | Dunlavy | 343/856 |
| 4,647,937 | 3/1987 | Hidaka et al. | 343/742 |
| 5,225,847 | 7/1993 | Roberts et al. | 343/745 |

*Primary Examiner*—Don Wong
*Assistant Examiner*—James Clinger
*Attorney, Agent, or Firm*—Michael J. Striker

[57] ABSTRACT

An antenna arrangement which is used for transmitting and receiving radio signals includes a capacitively tunable loop, from which received radio signals can be coupled symmetrically into a receiver stage, and which has a feed-in point, at which a signal to be radiated by the loop can be split into two signals moving in opposite directions to each other and with the same potential. Outcoupling of the received signals from the loop into the receiver stage can take place inductively via a coupling loop, or capactively via outcoupling capacitors, which are connected with the loop.

17 Claims, 2 Drawing Sheets

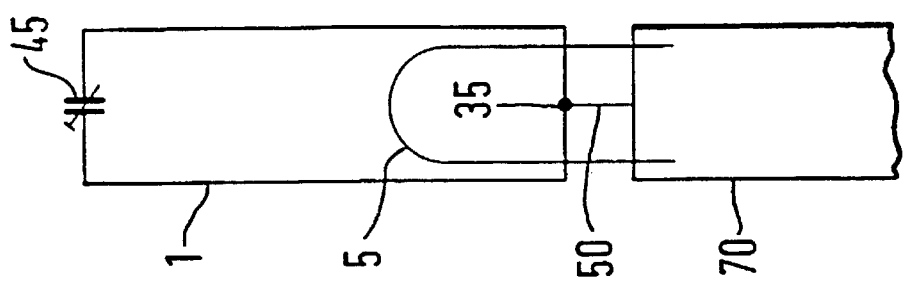
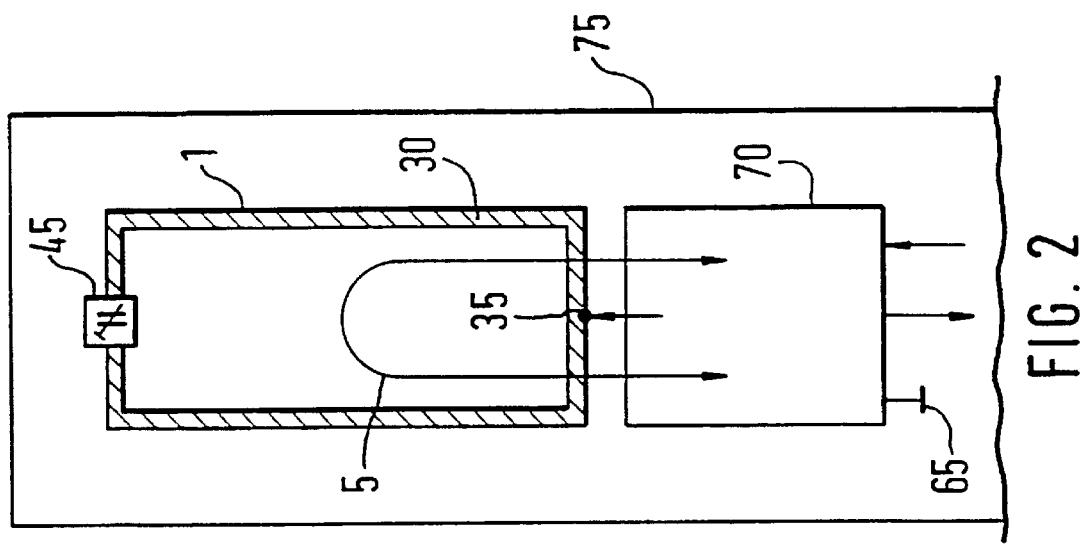
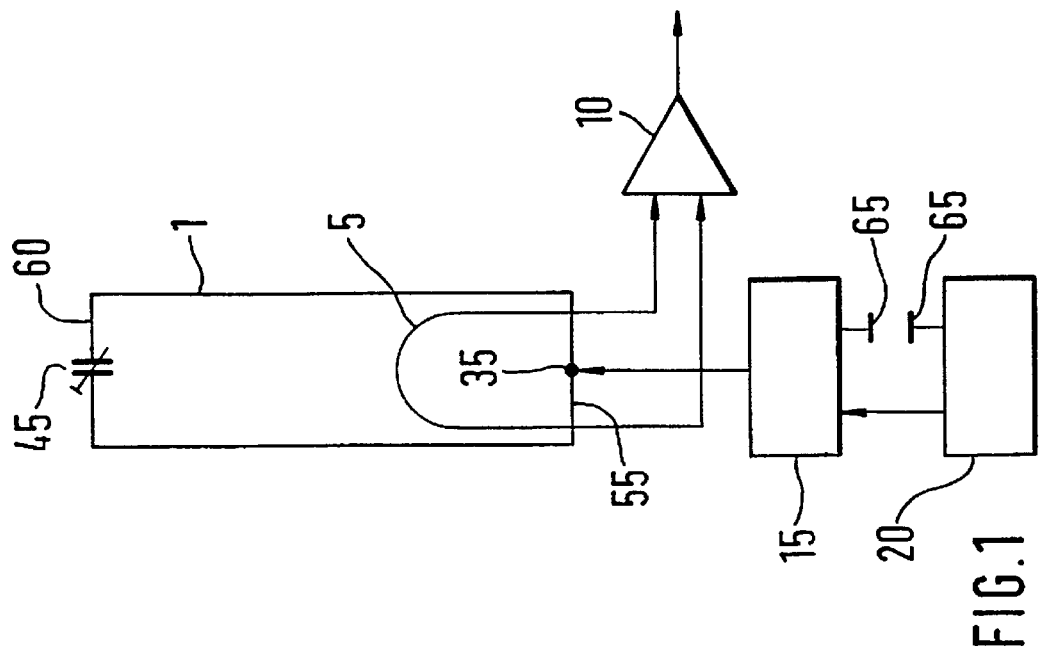

ANTENNA ARRANGEMENT

BACKGROUND OF THE INVENTION

An antenna arrangement is already known from U.S. Pat. No. 4,647,937, which comprises a first antenna loop to the radio frequency, and an amplifier for the received signal. A second antenna loop is furthermore provided, which comprises a second adjustable capacitor, wherein the first adjustable capacitor and the second adjustable capacitor can be set by means of a common actuating element. The first antenna loop is connected via the amplifier with a selector switch. The second antenna loop is directly connected via feed lines with the selector switch. By means of the selector switch either the output of the amplifier or the feed line of the second antenna loop can be connected with an output connector. Depending on the reception quality of the radio waves, the first antenna loop is connected via the amplifier with the output connector, or the second antenna loop via the feed line.

An antenna for a radio receiver is known from U.S. Pat. No. 4,625,212, which comprises a capacitively tunable loop.

An automatic tuning system for an antenna is known from U.S. Pat. No. 5,225,847, which contains a single adjustable reactance element. The output which is transmitted to the antenna, and the output which is reflected from the antenna to a feed line, are measured. A feed loop is provided, which is connected via the feed line with a transmitter/receiver. The transmitter/receiver can be operated in a transmitting mode or a receiving mode. In the transmitting mode the transmitter/receiver transmits a signal which is to be radiated by the antenna, to the feed loop.

A loop antenna is known from FR 2 636 781, which is intended to radiate a first signal and to receive a second signal as an echo. The loop antenna includes a pair of connecting terminals which is used for feeding in the first signal as well as for removing the second signal.

The invention relates to an antenna arrangement for transmitting and receiving radio signals.

A radio transmitting/receiving device is known from DE-OS 2 362 889, which has a circuit arrangement for the contactless selective connection of the antenna with the receiver or the transmitter. The circuit arrangement consists of controllable impedance networks respectively located between the antenna and the transmitter and between the antenna and the receiver, which are permeable for the operating frequency band, and of electronic switches assigned to the impedance networks. The critical frequency of the impedance network is electrically changed by the actuation of the electronic switch in such a way that the impedance network becomes impermeable to the operating frequency.

SUMMARY OF THE INVENTION

It is therefore an object of the present invention to provide an antenna arrangement which eliminates the disadvantages of the prior art.

In keeping with these objects, one feature of the present invention resides in an antenna arrangement for transmitting and receiving radio signals and having a capacitatively tunable loop from which received radio signals can be coupled symmetrical into a receiver stage, wherein in accordance with the present invention the capacitatively tunable loop has a feed-in point, at which a signal to be radiated by the loop can be split into two signals moving in opposite directions to each other and particularly with the same potential.

When the antenna arrangement is designed in accordance with the present invention has the advantage that no antenna switching is necessary during simplex voice communication, so that it is possible to save circuit outlay, space and costs.

It is furthermore advantageous, that with duplex voice communications in duplex operation also no elaborate high- and/or low-pass filter switches are necessary.

By means of the steps recited in the dependent claims, advantageous further developments and improvements of the antenna arrangement recited in independent claim 1 are possible.

In this case the inductive outcoupling of the received signals from the loop into the receiver stage via a coupling loop is advantageous. In this way only a negligible capacitive load because of the human body will occur in connection with radios which are normally carried on a human body when ready to receive, if the antenna is appropriately aligned as perpendicularly with the human body as possible.

The design of the loop as a rectangular loop is also advantageous, wherein the feed-in point is arranged on one side of the loop and a tuning capacitor on the opposite side, both respectively centered. If, in case of inductive outcoupling, the coupling loop is arranged symmetrically in relation to an axis of the loop extending through the tuning capacitor and the feed-in point, or respectively in case of capacitive outcoupling, the outcoupling capacitors are arranged symmetrically in relation to the axis extending through the tuning capacitor and the feed-in point, crosstalk during transmitting operations is prevented with a symmetrical or balanced input of the input stage.

The application of the loop in the form of a strip conductor on printed circuit material is also advantageous. In this way the antenna can be printed in a cost-effective way on printed circuit material.

It is moreover advantageous that a signal to be transmitted can be supplied to the feed-in point in a galvanically separated manner, preferably together with the use of an audio-frequency transformer. The load on the loop by the transmitting device is reduced in this way.

It is moreover advantageous that a signal to be transmitted can be supplied to the feed-in point via an extension conductor. It is possible in this way to match without noticeable outlay the mechanical length of the antenna to a corresponding desired transmission wavelength.

A pager in, which includes an antenna arrangement in accordance with the present invention, is advantageous. If the antenna arrangement is an integral component of the pager, space is saved.

BRIEF DESCRIPTION OF THE DRAWINGS

Preferred embodiments of the invention are represented in the drawings and will be explained in greater detail in the following description.

FIG. 1 shows a basic embodiment of an antenna arrangement in accordance with the invention with inductive outcoupling, FIGS. 2 and 3 respectively show an embodiment of the antenna arrangement in accordance with the invention with inductive outcoupling, FIG. 4 an antenna arrangement in accordance with the invention with balancing of the input of a receiver stage, and FIG. 5 an antenna arrangement in accordance with the invention with capacitive outcoupling.

DESCRIPTION OF THE EXEMPLARY EMBODIMENT

Figure 5:
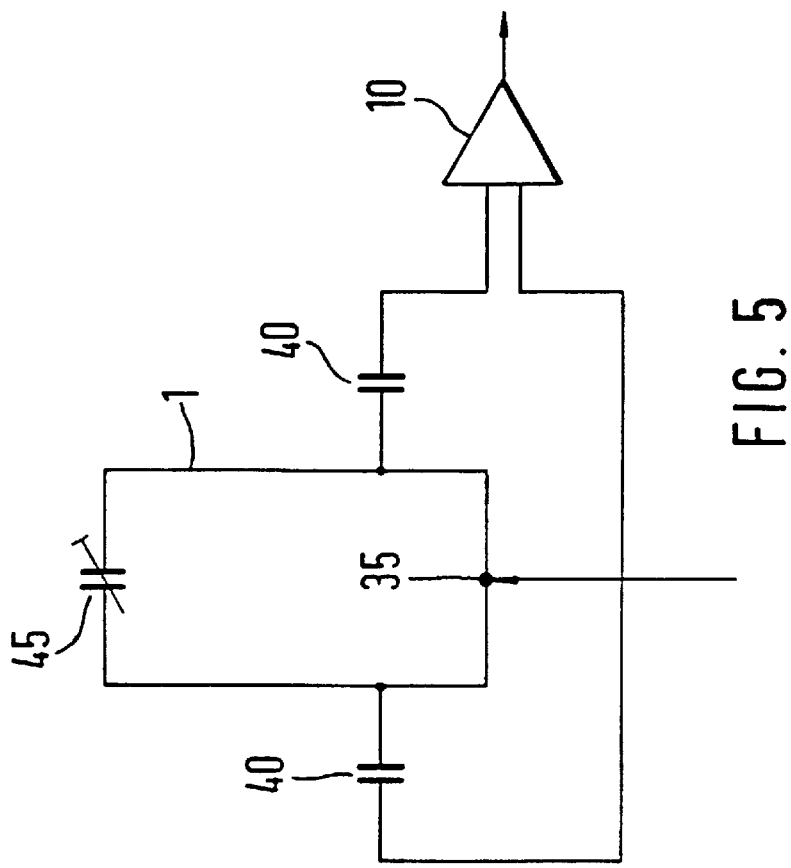

A metallic loop, which is designed as a rectangular loop, is identified by 1 in FIG. 1. A feed-in point 35 is located on a first narrow side 55 of the loop 1 in the center of this narrow side 55. A tuning capacitor 45 is situated in the center of the second narrow side 60 on the second narrow side 60 of the loop 1 located opposite the first narrow side 55. A coupling loop 5 on the first narrow side 55 of the loop 1 projects in the shape of a U into the loop 1 in such a way that it is arranged symmetrically in respect to an axis of the loop 1 extending through the tuning capacitor 45 and the feed-in point 35. The two outputs of the coupling loop 5 are provided to a receiver stage 10, which is connected with further receiving devices, not represented. An adaptation network 15 is connected with the feed-in point 35 and is connected on the one side to a reference potential 65 and on the other side to a transmitter device 20, wherein the transmitter device 20 is also connected to the reference potential 65.

The loop 1 is used as an antenna for transmitting and receiving radio signals. In case of reception, the received frequency can be brought into resonance by means of the tuning capacitor 45 which, for example, can be designed as a trimming capacitor. Outcoupling to the receiver stage 10 takes place inductively symmetrically via the coupling loop 5, wherein the input of the receiver stage 10 is also symmetrical. The received radio signals are passed on by the receiver stage 10 to the receiving devices, not further represented. The described antenna arrangement can be employed in radio devices which, for example, normally are carried on the human body when ready to receive. In this case the human body represents a capacitive load for the described magnetic antenna, wherein the load is smallest if this direction-dependent antenna is aligned perpendicular with the human body. Inductive, i.e. magnetic receiving antennas are primarily used in call-up receivers, or respectively pagers. By means of the antenna arrangement in accordance with the invention it is also possible to transmit with such a call-up receiver, for which the device is generally held by hand. The properties of the described antenna arrangement in case of receiving hardly change here.

In case of transmission, the antenna is operated via the lambda adaptation network 15 as a possibly shortened lambda radiator, operated with the reference potential 65, which represents the ground of the device, as the counterweight. The signals to be transmitted here are passed from the transmitter device 20 via the adaptation network 15 to the feed-in point 35 and are split there into two signals moving in opposite directions, which are then radiated by the loop 1. In case of transmitting, the loop 1 acts as a dipole half, so that no current flows in the two loop elements separated by the axis of symmetry extending through the feed-in point 35 and the tuning capacitor 45, and the same potential is formed in each half of the loop. Since no current flows in the two halves of the loop, the transmission signals are only capacitively outcoupled on the coupling loop 5, wherein the outcoupled signals are in equiphase because of the equal potential. They therefore cancel each other out in the receiver stage 10, so that no crosstalk because of the transmitted signals occurs. Because of this, in case of simplex voice communications, or respectively half-duplex operation, switching of the antenna can be omitted, and in case of duplex voice communications, or respectively duplex operation, the otherwise required elaborate high- and/or low-pass filter switches can be omitted, or respectively designed considerably more simply. If the tuning capacitor 45 and the feed-in point are not attached centered on the two narrow sides 55 and 60, and/or if the coupling loop 5 is not placed symmetrically in the described way into the loop 1, signals with different potentials result in the two loop halves, wherein also no current flows in the two loop halves, so that following capacitive outcoupling of the transmission signals from the loop 1 to the coupling loop 5, signals with different potential are also supplied, which cannot be compensated in the receiver stage 10, so that crosstalk results. To compensate the outcoupled transmission signals supplied in this case to the receiver stage 10, a suitable transformation network must be switched between the coupling loop 5 and the receiver stage 10.

An embodiment of the antenna arrangement shown in principle in FIG. 1 is represented in FIG. 2. In this case the loop 1 is designed as a strip conductor 30 and applied to printed circuit material 75. With the embodiment in accordance with FIG. 2, the adaptation network 15 and the receiver stage 10 have been integrated into a transmission/reception adaptation device 70, from which received signals are passed on to further receiving devices and which is supplied with signals to be transmitted by a transmitter device, wherein the further receiving devices and the transmitter device are not represented in FIG. 2, and only the input, or respectively output of the signals is marked by appropriate arrows. The transmission/reception adaptation device 70 is furthermore connected with the reference potential 65. The functioning of the antenna arrangement in FIG. 2 corresponds to the functioning of the antenna arrangement in FIG. 1. In FIG. 2, the transmission/reception adaptation device 70 and, if needed, the further receiver devices, and the transmitter device have also been applied to the printed circuit material 75, so that space can be saved in this way and the antenna arrangement, together with the transmitter and receiving devices can be integrated in a space-saving manner in the housing of a radio, or respectively of a pager.

However, in accordance with FIG. 3 it is also possible to separate the antenna arrangement from the housing of the radio, or respectively the pager, wherein the transmission/reception adaptation device 70 remains integrated in the housing. The loop 1 then can be a rectangularly designed loop made of a copper strip, for example. An extension conductor, for example designed as an extension tube, is moreover represented in FIG. 3 by the reference numeral 50, by means of which the mechanical length of the antenna between the feed-in point 35 and the adaptation network 15, or respectively the transmission/reception adaptation device 70, can be matched to a corresponding desired transmission wavelength.

Figure 4:
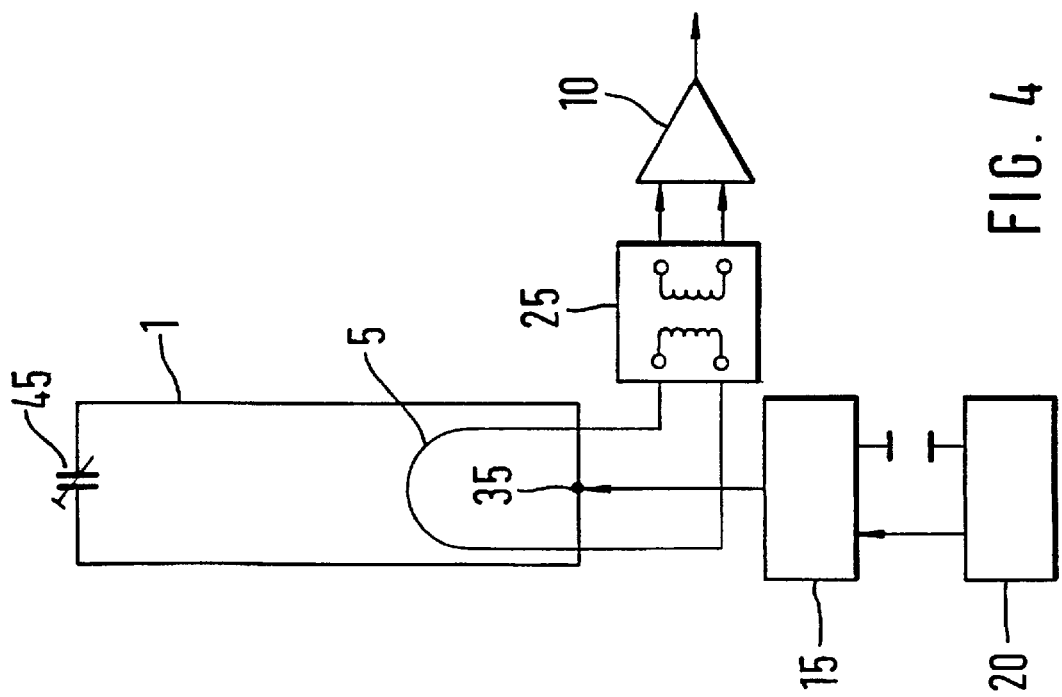

The antenna arrangement in accordance with FIG. 1 is represented in FIG. 4, wherein the receiver stage 10 does not have a symmetrical input. To balance the input of the receiver stage 10, a transformation network 25, preferably using audio-frequency transformers and/or phase shifters, has been switched between the receiver stage 10 and the coupling loop 5.

An antenna arrangement is represented in FIG. 5, wherein the outcoupling of the received signals from the loop 1 into the receiver stage 10 takes place capacitively by means of outcoupling capacitors 40 connected with the loop 1. In this case the loop 1 continues to be designed rectangular, and the feed-in point 35 and the tuning capacitor 45 are arranged on the loop 1 as described in FIG. 1. In this case an outcoupling capacitor 40 is connected to each of the two longitudinal sides of the loop 1, wherein the connecting points for the outcoupling capacitors 40 are arranged symmetrically in relation to the axis of the loop 1 extending through the tuning capacitor 45 and the feed-in point 35. In addition, the outcoupling capacitors 40 are connected with the receiver stage 10 by means of their electrode which is not connected with the loop 1.

In the receiver portion, the signals received in the loop 1 are capacitively outcoupled via the outcoupling capacitors 40 and are supplied to the receiver stage 10.

In case of transmitting, the transmission signals are again split into two signals moving in opposite directions in relation to each other with the same potential at the feed-in point 35, wherein crosstalk by means of the transmitted signals on the receiving devices is prevented because of the also symmetrical arrangement of the outcoupling capacitors 40 and the symmetrical, or respectively to be balanced, input of the receiver stage 10.

In a further exemplary embodiment, a signal to be transmitted can be supplied to the feed-in point 35 galvanically separated, for example by employing an audio-frequency transformer, or also capacitively, because of which the load on the loop 1 by the adaptation network 15 and the transmitter device 20 is reduced. In this case the audio-frequency transformer of the capacitive feed can be located between the feed-in point 35 and the adaptation network 15, or also in the adaptation network 15 itself.

What is claimed is:

1. An antenna arrangement for transmitting and receiving radio signals, comprising a receiver stage and a capacitatively tunable loop having an axis of symmetry and including two halves arranged symmetrically relative to said axis, and a feed-in point positioned on said axis of symmetry wherein radio signals received from the tunable loop can be coupled into the receiver stage in two signal flows symmetrical to each other relative to said axis of symmetry and wherein a signal to be radiated by the tunable loop is splittable at said feed-in point into two signals flowing in two opposite directions relative to the axis of symmetry such that same potential is formed in each half of the tunable loop.

2. An antenna arrangement as defined in claim 1, wherein said receiver stage has two inputs arranged symmetrically to each other.

3. An antenna arrangement as defined in claim 1, wherein said capacitatively tunable loop is a loop which is applied as a strip conductor on printed circuit material.

4. An antenna arrangement as defined in claim 1, wherein said capacitatively tunable loop is a loop composed of a copper strip.

5. An antenna arrangement as defined in claim 1; and further comprising means for galvanically separating a signal to be supplied to said feed-in point from a transmitter device.

6. An antenna arrangement as defined in claim 5, wherein said means for transmitting said galvanically separated signal is formed by an audio-frequency transformer.

7. An antenna arrangement as defined in claim 1; and further comprising means for transmitting a signal to said feed-in point and including an extension conductor for adjusting a mechanical length of the antenna arrangement to a desired transmission wavelength.

8. An antenna arrangement as defined in claim 7, wherein said extension conductor is an extension tube.

9. An antenna arrangement as defined in claim 1, wherein said capacitatively tunable loop is formed as rectangular loop, said feed-in point being arranged on one side of said loop; and further comprising a tuning capacitor arranged on an opposite side, said feed-in point and said tuning capacitor being both respectively centered.

10. An antenna arrangement as defined in claim 1; and further comprising outcoupling capacitors which are connected with said capacitatively tunable loop so that outcoupling of the received signals from said capacitatively tunable loop into said receiver stage takes place capacitatively via said outcoupling capacitors.

11. An antenna arrangement as defined in claim 10; and further comprising a tuning capacitor, said out coupling capacitors being arranged symmetrically in respect to an axis of said capacitatively tunable loop extending through said tuning capacitor and said feed-in point.

12. An antenna arrangement as defined in claim 1; and further comprising a coupling loop formed so that outcoupling of the received signals from said capacitatively tunable loop into said receiver stage takes place inductively via said coupling loop.

13. An antenna arrangement as defined in claim 12; and further comprising a tuning capacitor, said coupling loop being arranged symmetrically in respect to an axis of said capacitatively tunable loop extending through said tuning capacitor and said feed-in point.

14. An antenna arrangement as defined in claim 12; and further comprising a transformation network switched between said receiver stage and said coupling loop for balancing an input of said receiving stage.

15. An antenna arrangement as defined in claim 14, wherein said transformation network is a network using audio-frequency transformers.

16. An antenna arrangement as defined in claim 14, wherein said transformation network is a network using phase shifters.

17. A pager comprising a paging part and an antenna arrangement, said antenna arrangement including a receiver stage, and a capacitatively tunable loop having an axis of symmetry and including two halves arranged symmetrically relative to said axis, and a feed-in point positioned on said axis of symmetry wherein radio signals received from the tunable loop can be coupled into the receiver stage in two signal flows symmetrical to each other relative to said axis of symmetry and wherein a signal to be radiated by the tunable loop is splittable at said feed-in point into two signals flowing in two opposite directions relative to the axis of symmetry such that same potential is formed in each half of the tunable loop.

* * * * *